(12) United States Patent
Åsberg

(10) Patent No.: US 6,193,451 B1
(45) Date of Patent: Feb. 27, 2001

(54) HOLDER FOR THE DETACHABLE MOUNTING OF CUTTING TOOLS WITH PREDETERMINED MAXIMUM CLAMPING FORCE

(75) Inventor: Mats Åsberg, Järbo (SE)

(73) Assignee: Sandvik Aktiebolag, Sandviken (SE)

( * ) Notice: Subject to any disclaimer, the term of this patent is extended or adjusted under 35 U.S.C. 154(b) by 0 days.

(21) Appl. No.: 09/326,677

(22) Filed: Jun. 7, 1999

(30) Foreign Application Priority Data

Jun. 24, 1998 (SE) ................................................ 9802243

(51) Int. Cl.⁷ ............................... B23C 5/26; B23B 31/10
(52) U.S. Cl. ........................ 409/233; 82/160; 408/239 R
(58) Field of Search ................................... 409/231, 232, 409/233, 234; 408/238, 239 R; 82/160; 279/4.12, 4, 2.09, 74, 155; 137/539, 539.5

(56) References Cited

U.S. PATENT DOCUMENTS

| | | |
|---|---|---|
| 3,842,712 * | 10/1974 | Bondie et al. ................... 408/239 A |
| 4,008,646 * | 2/1977 | Hague et al. ........................ 409/233 |
| 4,398,326 * | 8/1983 | Joerger ................................. 279/155 |
| 4,583,894 * | 4/1986 | Mitchell ............................... 409/233 |
| 4,746,252 * | 5/1988 | Jesinger .............................. 409/233 |
| 4,930,553 * | 6/1990 | Grillo ................................ 137/539.5 |
| 5,096,347 * | 3/1992 | Kumagai et al. .................... 408/239 |
| 5,193,954 * | 3/1993 | Hunt ..................................... 409/233 |
| 5,626,325 * | 5/1997 | Buchanan et al. ................ 137/539.5 |
| 5,662,442 * | 9/1997 | Taki et al. ............................ 409/233 |
| 5,707,186 * | 1/1998 | Gobell et al. ........................ 409/233 |

* cited by examiner

Primary Examiner—William Briggs
(74) Attorney, Agent, or Firm—Burns, Doane, Swecker & Mathis, L.L.P.

(57) ABSTRACT

A tool holder includes a house and a clamping mechanism provided therein. The clamping mechanism includes a male member adapted to engage in a female-like opening in a tool. The male member is movable to and fro between clamping and releasing positions by means of a piston device that separates inner and outer hydraulic medium chambers. A passage extends through the piston device and emerges in the two chambers. A valve is provided in the passage in order to open the passage when the hydraulic pressure in the outer chamber rises to a preset limit value so as to limit the amount of force that clamps the tool.

9 Claims, 2 Drawing Sheets

HOLDER FOR THE DETACHABLE MOUNTING OF CUTTING TOOLS WITH PREDETERMINED MAXIMUM CLAMPING FORCE

TECHNICAL FIELD OF THE INVENTION

This invention relates to a holder adapted for the detachable mounting of cutting tools, said holder comprising a house and a clamping mechanism provided in said house. The clamping mechanism includes a male member adapted to engage in a female-like opening in the tool. The male member is movable to and fro between an inner end position, where the tool is clamped relative to the house, and an outer end position, where the tool is releasable from the house. The male member is moved by means of a piston device that is movable to and fro in a cavity within the house. The piston device separates outer and inner chambers to and fro which a hydraulic medium may be fed in order to move said male member towards one of said end positions.

BACKGROUND OF THE INVENTION

Tool holders of the kind defined above are frequently present in automatic machines for metal cutting, i.e. turning, milling, drilling and the like. A benefit with this type of holder is that it allows quick and simple tool exchanges. However, a problem in connection with previously known tool holders is the adjustment of the pressure of the hydraulic medium, usually oil, that is fed into one of the chambers of the house in order to either clamp the tool or push out the same. The adjustment of the pressure is especially tricky as regards the hydraulic medium that is fed into the outer chamber in connection with clamping of the tool. If the tool is clamped by an excessively large force, the components included in the clamping mechanism may be damaged or at least, in the long run, be worn out too quickly. Therefore, it is desirable to limited the maximum pressure of the hydraulic medium that is fed to the outer chamber.

A theoretically feasible solution of the problem mentioned above would be to provide an external pressure adjusting system in the hydraulic system of the automatic machine itself, i.e. to provide, in one way or another, a fine adjustment of the pressures to both of the hydraulic medium chambers of the tool holder. However, this is for several reasons not an attractive solution. Since the pressure adjustment in such a case would take place at a distance from the tool holder, unavoidable pressure variations in the hydraulic system as a whole (as a consequence of the fact that other functions in the machine is activated or inactivated) may lead to the consequence that the outer chamber will not safely operate with a certain maximum pressure. Further, a remote controlled pressure adjusting system would run a risk that individual operators could too easily change the working pressures in the respective chambers in an uncontrolled way that is not always desired.

OBJECTS AND FEATURES OF THE INVENTION

The present invention aims at obviating the problems mentioned above and providing an improved tool holder. Thus, a primary object of the invention is to provide a tool holder that independently of any pressure variations being present in the hydraulic system as a whole, always guarantees that the hydraulic pressure in the outer chamber is maximized to an upper limit value. A further object is to provide a tool holder in which the adjustment of the hydraulic pressure calls for certain measures, more precisely in order to eliminate the risk that individual operators may change the pressure in an uncontrolled manner. Still a further object of the invention is to provide a tool holder that realizes the desired pressure adjusting function via structurally simple and inexpensive means.

SUMMARY OF THE INVENTION

According to the invention a holder is adapted for detachably holding a cutting tool. The holder comprises a house and a clamping mechanism mounted in a cavity of the house. The clamping mechanism includes a clamp element adapted for clamping a tool, and an actuating mechanism for moving the clamp element to a tool-clamping position. The actuating mechanism includes a piston mounted for reciprocation in the cavity. The piston divides the cavity into first and second chambers. The first chamber communicates with a source of pressurized hydraulic fluid for displacing the piston in a direction causing the clamping element to clamp a tool against the house. The piston includes a passage formed therein and communicating the first chamber with the second chamber. A valve disposed in the passage is biased to a passage closing position for normally blocking communication between the first and second chambers. The valve is exposed to pressure in the first chamber and is movable to a passage-opening position to relieve pressure in the first chamber when the pressure in the first chamber exceeds a predetermined value.

BRIEF DESCRIPTION OF THE DRAWINGS

The objects and advantages of the invention will become apparent from the following detailed description of preferred embodiments thereof in connection with the accompanying drawing, in which like numerals designate like elements, and in which.

DETAILED DESCRIPTION OF PREFERRED EMBODIMENTS OF THE INVENTION

Figure 1:
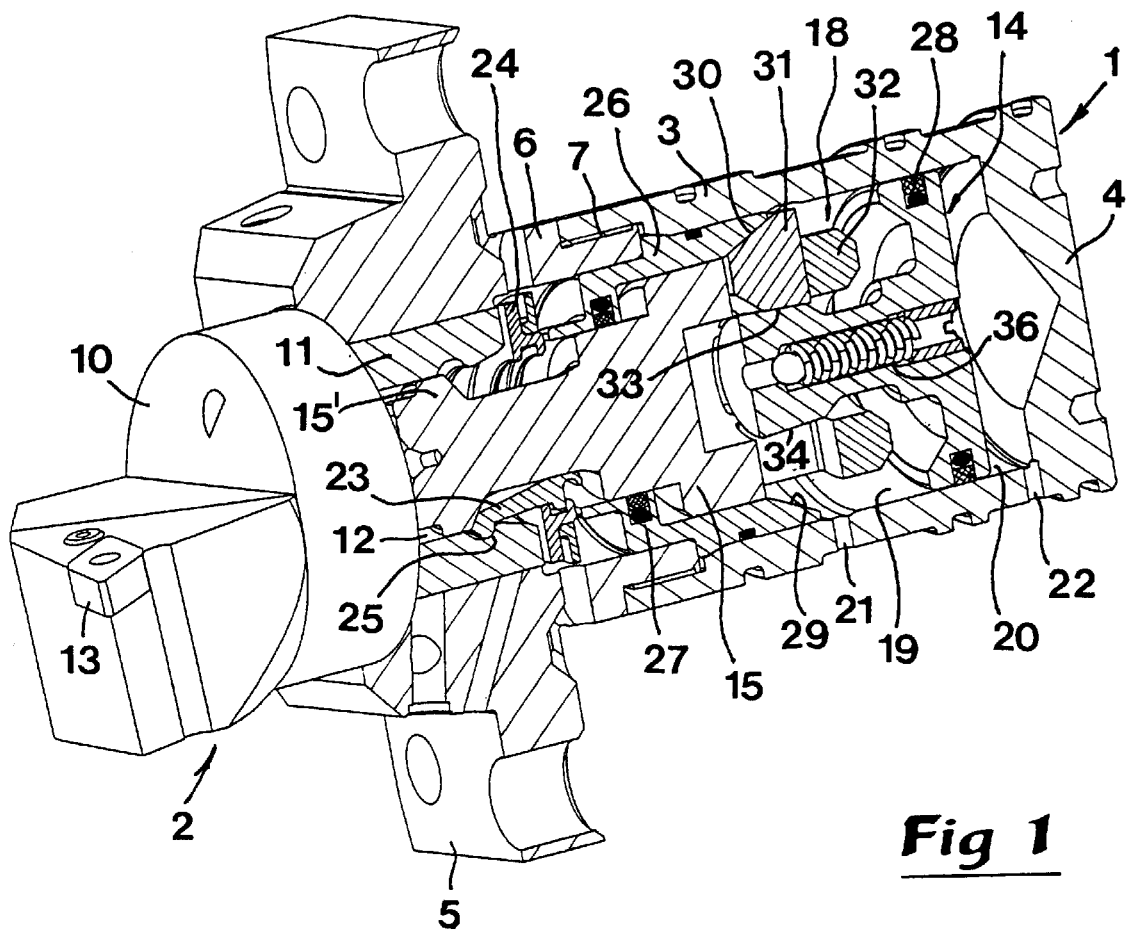
FIG. 1 is a perspective longitudinal section through a holder according to the invention, where a cutting tool applied in the holder is partly shown in view, partly in section.
Figure 2:
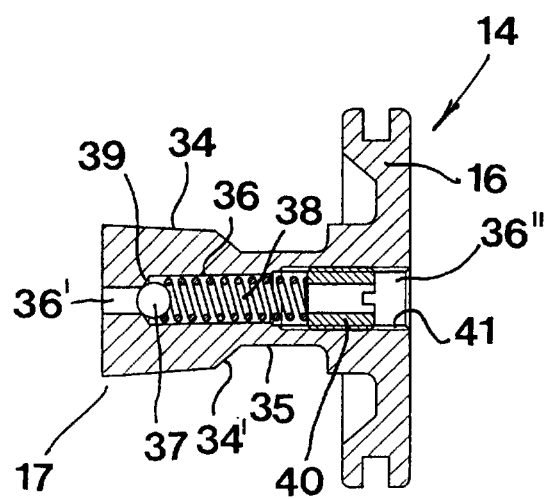
FIG. 2 is a longitudinal section through a piston device included in the tool holder, said piston device being designed in accordance with the principles of the invention.
Figure 3:
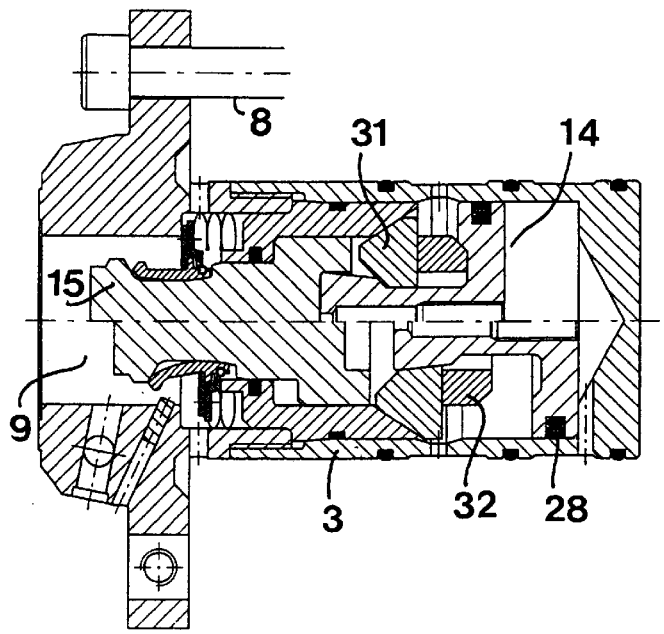
FIG. 3 is a longitudinal section through the tool holder according to FIG. 1 and 2, the upper half of the section illustrating a first mode of function in which the tool is releasable from the holder, while the lower half illustrates a second mode of function in which the tool is clamped in the holder.

In FIGS. 1–3 reference numeral 1 generally designates a tool holder in which a tool, designated 2 may be detachably mounted. The holder 1 is in the shape of a cylindrical house that is composed of front and rear parts. The rear part comprises a cylindrical tube 3 and an end wall 4, and the front part comprises a flange 5 and a tube socket 6 extending rearwardly from the flange 5, said tube socket 6 being connected with the cylindrical tube 3 via a thread coupling 7. In the flange 5, that may be fixed in an adherent machine by means of screws 8 (see FIG. 3), a central hole 9 is provided, said hole 9 serving to receive the tool 2.

Apart from a head 10, the tool 2 comprises a part 11 in the shape of a short tube piece, said part 11 extending rearwardly from the head 10 and defining a female-like opening 12 that emerges rearwardly. In practice, the external envelope surface of the tube piece 11, as well as the internal surface of the hole 9, could have a polygonal cross sectional shape or an axially tapering shape. Such tools are commercially available under the trade name COROMANT CAPTO™. As is evident from FIG. 1 the tool 2 is equipped with at least one cutting insert 13.

Within the house of the holder an actuator is provided which comprises two components 14, 15 that are axially movable to and fro, more precisely a piston device 14 and a male member designated by 15. As is evident from FIG. 2 the piston device 14 includes, on one hand, an actual piston 16 and, on the other hand, a spigot 17 projecting from one side of the piston 16. The piston 16 divides a cavity 18 within the house into a frontal or outer chamber 19, on one hand, and a rear or inner chamber 20, on the other hand. Oil or another suitable hydraulic medium may be fed into or out of said chambers via first and second passages 21 and 22 respectively.

The male member 15 has a rotationally symmetrical shape and engages a number of circumferentially separated fingers 23 that are mounted in a ring 24. The fingers 23 include thickened outer portions adapted to engage in a groove 25 formed in the inner side of the tube piece 11. In the area of an intermediate section, the male member 15 is sealed, via a sealing ring 27, against a sleeve 26 provided in the house. In a hydraulic respect, the outer chamber 19 is defined between, on one hand, said sealing ring 27 and, on the other hand, another sealing ring 28 located at the periphery of the piston 16.

At its rear end the sleeve 26 has a conical, rearwardly widening surface 29 against which may abut conical surfaces 30 that are provided on circumferentially separated driving bodies 31. Rear, planar end surfaces of these driving bodies abut a ring 32 included in the male member 15. Internal conical surfaces 33 of the bodies 31 abut a conical surface 34 on the spigot 17 of the piston device, said conical surface 34 converging (narrowing) in a rearward direction. Between the conical surface 34 and the piston 16 itself, the spigot 17 has a waist portion 35 of reduced diameter. Between the waist portion 35 and the conical surface 34 there is a second conical surface 34' having an essentially larger cone angle than the conical surface 34.

The male member 15, the fingers 23, the driving bodies 31 and the spigot 17 together form the main components of a clamping mechanism by means of which the tool 2 may be either clamped in the house of the tool holder or released therefrom. More precisely, the clamping is effected in the state shown in the lower half of FIG. 3. In this state the piston device has been displaced, by the feeding of hydraulic oil to the outer chamber 19, to an inner (rear) end position in which the conical surfaces 34 and 34' have displaced the driving bodies 31 axially rearwardly while urging them outwards to radially outer end positions. At the same time as the bodies 31 move axially rearwards, they displace the ring 32 axially rearwardly and thus the entire male member 15 is driven axially rearwardly. When the male member approaches its rear end position the thickened, free end portions of the fingers 23 engage the groove 25 at the rear side of the tube piece 11 and are firmly urged into the groove, against an elastic bias of the fingers, by means of a thickened, partly conically shaped end portion 15' (see FIG. 1) of the male member. The portion 15' also urges the fingers 23 (and thus the tool) axially rearwardly, whereby the fingers clamp and lock the tool against the holder.

Oil is fed into the inner chamber 20 via the passage 22 (simultaneously as the oil from the chamber 19 returns to the reservoir via the passage 21) when the tool is to be released and pushed out of the holder. In doing so, the male member will be moved to a forward end position (as shown in the upper half of FIG. 3), when the free front end surface of the piston spigot 17 abuts against an analogous rear end surface of the male member. Hereby, the ring 32 drives the driving bodies 31 in the axial forward direction and the conical surfaces 29, 30 effectuate movement of said bodies also in the radial inward direction. When the male member 15 is moved to its forward end position, the fingers 23 are elastically restored to their radially inward position and said fingers are released from the engagement in the groove 25. This means that the locking of the tool relative to the holder ceases and the tool is pushed partially out of the holder in one piece by the spigot 17 to subsequently be removed from the holder by hand.

As described thus far, the shown tool holder is previously known in all essential aspects.

Significant for the present invention is that a passage 36 (see FIG. 2) extends through the piston device 14 and includes a valve having the function of opening the passage when the hydraulic pressure in the outer chamber 19 increases to a set limit value. In the embodiment according to FIGS. 1–3 the valve is constituted by a ball 37 that is loaded by a pressure spring 38, e.g. a helical pressure spring. The ball abuts a seat 39 that is provided in the transition between a narrow, outer passage section 36' and a wider passage section 36". Thus, the valve constitutes a pressure restriction valve with a check valve function.

In accordance with a preferred embodiment of the invention the spring 38 cooperates with means for adjustably setting the spring force thereof. Thus, FIG. 2 shows how the rear or inner end of the spring 38 abuts an externally threaded sleeve 40 that is in engagement with an internal thread 41 in the passage 36. In the example, the sleeve 40 has a groove for a driver that may be inserted into the passage in order to cause the sleeve to rotate and hence be displaced axially in either direction in order to alternatively increase or decrease the spring force. This means that the ball 37, serving as a valve body, is urged against the associated seat with a force that will be overcome when the hydraulic pressure in the chamber 19 reaches the desired value.

Figure 4:
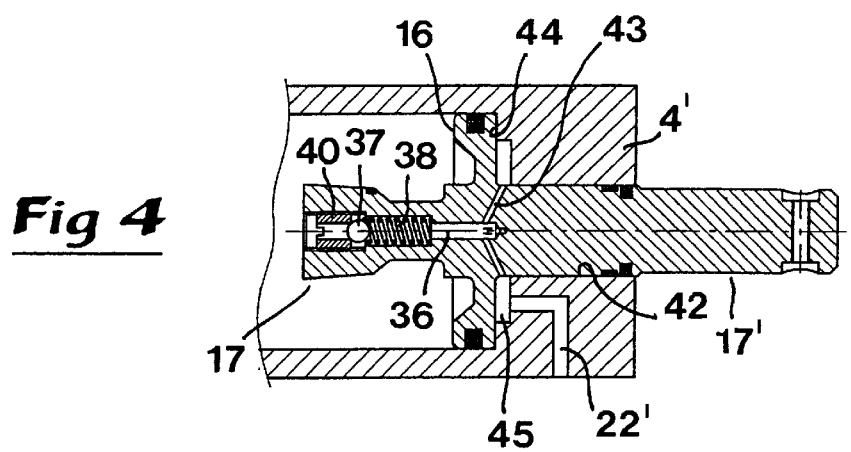
FIG. 4 is a partial rear longitudinal section through a holder according to a second, alternative embodiment of the invention.

Reference is now being made to FIG. 4 showing an alternative embodiment of the tool holder according to the invention. In a known way the piston device in this case includes not only the spigot 17 projecting ahead of the piston 16, but also a rear spigot 17' projecting in a rearward direction relative to the piston. Said rear spigot 17' extends through a through hole 42 in the end wall 41 of the cylindrical house. The free, projecting end of the spigot 17' is thus located outside of the house of the holder, and thereby the spigot may be coupled to a measuring device or a sensing device by means of which it can be determined whether the male member of the clamping mechanism is in its forward or rearward end position.

As regards the embodiment according to FIG. 4 the central oil passage 36 is divided into one or more radial branch passages 43 that emerge in the envelope surface of the rear spigot 17', preferably close to the piston 16. In its rear end position, shown in FIG. 4, the piston 16 abuts an annular abutment surface 44, inside of which a recess 45 is provided in the end wall 4'. The branch passages 43 are located in such a way that they emerge in this recess when the piston device assumes its inner end position. In this example the oil-passage 22' is L-shaped and provided in the end wall 4' itself.

As is evident from FIG. 4 the ball 37, serving as a valve body, is, in this embodiment, located between the spring 38 and the sleeve 40, a seat for the ball being provided in the sleeve itself. Also in this case the adjustment of the spring force is effected by screwing of the sleeve 40, although said sleeve 40 abuts the ball that in its turn abuts the spring.

Figure 5:
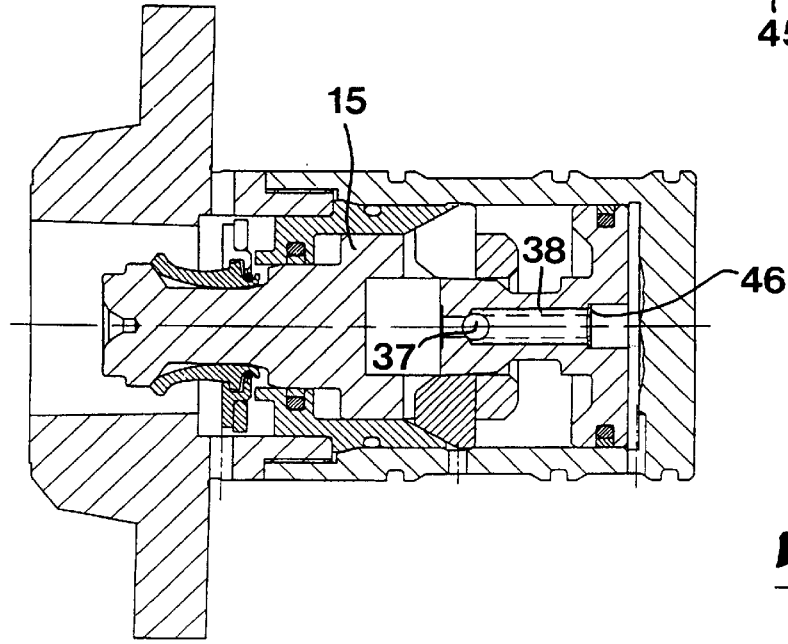
FIG. 5 is a longitudinal section, corresponding to FIG. 3, said section showing a third alternative embodiment of the invention.

The embodiment according to FIG. 5 differs from the embodiment according to FIGS. 1–3 essentially only in the respect that the valve spring 38 works with a force that is set once and for all. Thus the spring and the ball 37 are secured in the adherent passage by means of an elastic washer 46 that is fixed by snapping against an abutment shoulder in a rear end portion of the passage.

A basic advantage of the tool holder according to the invention is that the pressure adjustment, more precisely the determination of a maximum pressure present in the outer hydraulic chamber, takes place within the tool holder itself and not by means of adjusting devices that are spaced from the tool holder. Among other things, this means that sufficient pressure adjustment may be effected in an exact way without depending on possible pressure variations in the hydraulic system as a whole. Furthermore, the risk of non-authorized adjustments of the working pressure of the tool holder is eliminated.

Feasible Modifications of the Invention

The invention is not limited to the embodiments described and shown in the drawings only. Although it is preferred to locate the overflow passage between the two hydraulic chambers centrally in the piston device, it is alternatively possible to locate the passage and the adherent check valve in a non-centric position in the piston device. The passage need not necessarily extend axially through the piston. Thus, it is only essential that the passage at its opposite ends emerges in the respective chambers and allows liquid to flow between said chambers when the valve is opened. Although a spring-loaded ball is exemplified in the drawings also other, arbitrary valve designs are feasible. The valve body may for instance be in the shape of a cone. The invention is not limited to the type of tool holder that is marketed under the trade name COROMANT CAPTO™, but may be used in connection with any suitable tool holders.

Although the present invention has been described in connection with preferred embodiments thereof, it will be appreciated by those skilled in the art that additions, deletions, modifications, and substitutions not specifically described may be made without departing from the spirit and scope of the invention as defined in the appended claims.

What is claimed is:

1. A holder adapted for detachably holding a cutting tool, said holder comprising:
   a house having an internal cavity;
   a clamping mechanism mounted in the cavity and including:
      a clamp element adapted for clamping a tool, and
      an actuating mechanism for moving the clamp element to a tool-clamping position, the actuating mechanism including a piston mounted for reciprocation in the cavity, the piston dividing the cavity into first and second chambers, the first chamber communicating with a source of pressurized hydraulic fluid for displacing the piston in a direction causing the clamping element to clamp a tool against the house,
      the piston including a passage formed therein and communicating the first chamber with the second chamber, a valve disposed in the passage and biased to a passage-closing position for normally blocking communication between the first and second chambers, the valve being exposed to pressure in the first chamber and movable by pressurized fluid in the first chamber to a passage-opening position to relieve pressure in the first chamber when a tool is clamped and the pressure in the first chamber exceeds a predetermined value.

2. The holder according to claim 1 wherein the valve comprises a spring-biased ball.

3. In combination, a tool and a holder for detachably holding the tool,
   the tool including a rearwardly open opening,
   the holder including a house and a clamping mechanism mounted in a cavity of the house,
      the house having a central hole in which a rear portion of the tool is disposed,
      the clamping mechanism including clamp fingers extending into the opening of the tool and lockingly engaging the tool, and an actuating mechanism retaining the clamp fingers in locking engagement with the tool, the actuating mechanism including a piston mounted for reciprocation in the cavity, the piston dividing the cavity into first and second chambers, the first chamber communicating with a source of pressurized hydraulic fluid for displacing the piston in a direction causing the clamping element to clamp a tool against the house,
      the piston including a passage formed therein and communicating the first chamber with the second chamber, a valve disposed in the passage, and biased to a passage-closing position for normally blocking communication between the first and second chambers, the valve being exposed to pressure in the first chamber and movable by pressurized fluid in the first chamber to a passage-opening position to relieve pressure in the first chamber when a tool is clamped and the pressure in the first chamber exceeds a predetermined value.

4. The holder according to claim 1 wherein the valve is biased by a spring, and further including an adjusting mechanism for adjusting a force applied to the valve by the spring.

5. The holder according to claim 4 wherein the adjusting mechanism comprises an externally threaded sleeve arranged to be displaced for compressing the spring by a selected amount.

6. The holder according to claim 5 wherein the valve is disposed between the spring and a seat formed in the piston.

7. The holder according to claim 5 wherein the valve is disposed between the spring and the sleeve, the sleeve forming a valve seat.

8. The holder according to claim 1 wherein the passage extends axially through a center of the piston.

9. The holder according to claim 1 wherein said piston is part of a piston device having front and rear spigots extending respectively forwardly and rearwardly from said piston along a center axis thereof, said front spigot extending into said first chamber, said rear spigot projecting out of said house through a hole formed therein, a front end of said passage opening into said first chamber, said passage forming a plurality of generally radially extending branches opening at respective locations behind said piston.

* * * * *